United States Patent
Komenoi

(10) Patent No.: US 6,426,024 B1
(45) Date of Patent: Jul. 30, 2002

(54) AROMATIC POLYESTER PREFORM, BLOW MOLDED PRODUCT AND PREFORM PRODUCTION PROCESS

(75) Inventor: Akio Komenoi, Tokyo (JP)

(73) Assignee: Teijin Limited, Tokyo (JP)

( * ) Notice: Subject to any disclaimer, the term of this patent is extended or adjusted under 35 U.S.C. 154(b) by 0 days.

(21) Appl. No.: 09/381,674

(22) PCT Filed: Jan. 26, 1999

(86) PCT No.: PCT/JP99/00309

§ 371 (c)(1),
(2), (4) Date: Sep. 23, 1999

(87) PCT Pub. No.: WO99/37451

PCT Pub. Date: Jul. 29, 1999

(30) Foreign Application Priority Data

Jan. 27, 1998  (JP) .......................................... 10-014004
Jan. 27, 1998  (JP) .......................................... 10-014007

(51) Int. Cl.[7] .......................... B29C 45/34; B65D 23/00; B32B 1/08

(52) U.S. Cl. ............. 264/102; 264/331.18; 264/331.21; 215/400; 428/35.7; 428/35.8; 428/36.9; 428/36.92

(58) Field of Search .............................. 264/102, 331.18, 264/331.21; 428/35.7, 35.8, 36.9, 36.92; 215/400

(56) References Cited

U.S. PATENT DOCUMENTS

| | | | |
|---|---|---|---|
| 4,670,203 A | 6/1987 | Chang ........................ | 264/40.6 |
| 4,822,269 A | 4/1989 | Kamiyama et al. .......... | 425/203 |
| 5,294,695 A | 3/1994 | Lee et al. | |
| 5,302,686 A * | 4/1994 | Tanaka et al. ............... | 428/35.7 |
| 5,534,204 A | 7/1996 | Aoki et al. | |
| 5,556,581 A | 9/1996 | Aoki et al. | |
| 5,597,525 A | 1/1997 | Koda et al. | |
| 5,648,032 A * | 7/1997 | Nelson et al. ............... | 264/101 |
| 5,656,221 A * | 8/1997 | Schumann et al. ........... | 264/85 |
| 5,898,060 A | 4/1999 | Suzuki et al. | |
| 5,902,539 A * | 5/1999 | Schmidt et al. .............. | 264/513 |

FOREIGN PATENT DOCUMENTS

| | | |
|---|---|---|
| DE | 19503053 | 8/1996 |
| GB | 0 765 725 A2 | 4/1997 |
| JP | 60287289 A | 10/1994 |
| JP | 7060803 A | 3/1995 |
| JP | 70276450 A | 10/1995 |
| JP | 8053541 A | 2/1996 |
| JP | 727303 A2 | 8/1996 |
| JP | 7485674 A2 | 12/1996 |
| JP | 9040853 A | 2/1997 |
| JP | 9094824 A | 4/1997 |
| JP | 10045883 A | 2/1998 |
| JP | 11060704 A | 3/1999 |
| WO | 97/05186 | 2/1997 |

OTHER PUBLICATIONS

Patent Abstract of Japan, vol. 006, No. 076, (Abstract of JP 57 015946, Jan. 27, 1982).
Patent Abstract of Japan, vol. 1996, No. 07, (Abstract of JP 08 059967, Mar. 5, 1996).

\* cited by examiner

*Primary Examiner*—Suzanne E. McDowell
(74) *Attorney, Agent, or Firm*—Sughrue Mion, PLLC

(57) ABSTRACT

A preform having a small content of acetaldehyde can be advantageously produced by forming a vent, from which air is exhausted during molding, at a specific position of a molding machine in order for an aromatic polyester to be advantageously exposed under reduced pressure in a molten state when a preform of the aromatic polyester is injection molded.

12 Claims, No Drawings

AROMATIC POLYESTER PREFORM, BLOW MOLDED PRODUCT AND PREFORM PRODUCTION PROCESS

TECHNICAL FIELD

The present invention relates to an aromatic polyester preform, a blow molded product and a preform production process. More specifically, it relates to a blow molded product having a small content of acetaldehyde, a preform providing the product and a production process for the preform.

BACKGROUND ART

Glass has been heretofore widely used as a material for containers for seasonings, oil, refreshing beverages, beer, Japanese sake, cosmetics, detergents and the like. However, glass is heavy, costly to distribute, and dangerous to handle because of its fragility.

To overcome these defects of glass containers, plastic containers have now been rapidly replacing the glass containers. Of plastic materials for these plastic containers, polyethylene terephthalate is now widely used as a substitute material for glass containers because it has excellent mechanical strength, heat resistance, transparency, gas barrier properties and the like.

However, since a polyethylene terephthalate container may not exhibit a sufficient ultraviolet screening function depending on its application, the irradiation of ultraviolet light from the outside may cause the degeneration of quality and taste of a food contained therein or the discoloration or deterioration of a cosmetic contained therein with the result of a reduction in its trade value. Polyethylene terephthalate itself is a resin having low heat resistance unless it is crystallized, and a polyethylene terephthalate container must be filled with content at a high temperature or showered with hot water after filling for the purpose of sterilization according to the type of the content. Therefore, a material having high heat resistance is desired. High gas barrier properties are also desired to extend the shelf life of content according to the type of the content.

Polyethylene naphthalene dicarboxylate is known as a resin with which the above problems can be overcome.

Polyethylene naphthalene dicarboxylate has higher melt viscosity than polyethylene terephthalate. Therefore, when this resin is molded in accordance with a conventional method for blow molding polyethylene terephthalate into a biaxially oriented bottle, a large content of acetaldehyde is formed and the obtained molded product has a large content of acetaldehyde. Thus, when this molded product is used particularly as a container for a beverage, the flavor of content is spoiled.

It has recently been known that the above problem can be overcome by blending polyethylene naphthalene dicarboxylate with polyethylene terephthalate.

However, when a copolymer resin of ethylene terephthalate and ethylene naphthalene dicarboxylate is produced by a conventionally known copolymerization method, the solid-phase polymerization temperature must be lowered due to a reduction in a melting point, thereby causing a reduction in productivity. This causes not only an increase in costs but also the production of a resin having a different blending ratio for each required quality, thereby increasing production costs and making the control of molding complicated. Since a resin containing 20 to 80 mol % of ethylene naphthalene dicarboxylate is amorphous, handling properties at the time of drying and solid-phase polymerization deteriorate and required physical properties may not be obtained.

As means of obtaining required quality and reducing the production costs of a resin and a molded product, there is proposed a method comprising blending polyethylene naphthalene dicarboxylate with polyethylene terephthalate and molding the blend.

However, since polyethylene terephthalate and polyethylene naphthalene dicarboxylate have low compatibility with each other, a molded product obtained by simply blending these is opaque with low transparency, thereby causing a great reduction its trade value. Even if a transparent molded product can be obtained by selecting severe molding conditions to improve compatibility between them, for example, by raising the injection temperature or increasing the back pressure, a large content of acetaldehyde or oligomers is formed during molding and the oligomers are adhered to the vent portion of the mold of an injection molding machine, thereby causing such problems as burned spot or short shot. In the case of a beverage in particular, the flavor of content is spoiled when the content of acetaldehyde is large.

Since acetaldehyde and oligomers are formed in large quantities during molding, the above problems cannot be solved simply by reducing the content of acetaldehyde or the content of oligomers in a polymer used.

DISCLOSURE OF THE INVENTION

It is therefore an object of the present invention to provide a process for producing a preform having a small content of acetaldehyde from various aromatic polyester materials, which is accompanied by the formation of acetaldehyde during injection molding as described above.

It is another object of the present invention to provide a process for producing a preform having excellent transparency, a small content of acetaldehyde and a small content of oligomers.

It is still another object of the present invention to provide a preform having a small content of acetaldehyde and excellent transparency, which is produced by the above process of the present invention.

It is still another object of the present invention to provide a biaxially oriented blow molded product obtained by blow molding the above preform of the present invention.

Other objects and advantages of the present invention will become apparent from the following description.

According to the present invention, firstly, the above objects and advantages of the present invention are attained by a process for producing a preform by injection molding an aromatic polyester which comprises at least one aromatic dicarboxylic acid selected from the group consisting of terephthalic acid and 2,6-naphthalenedicarboxylic acid as a main dicarboxylic acid component and ethylene glycol as a main diol component, wherein injection molding is carried out by an injection molding machine, which has at least one vent at the position of a cylinder between a position where the aromatic polyester is substantially molten in the cylinder of the injection molding machine and the position of the front-end of the metering zone of a screw when the molten aromatic polyester is stored in the front-end portion of the cylinder of the injection molding machine for injection molding, while air is exhausted from the vent under reduced pressure.

According to the present invention, there are further provided a preform produced by the above process and a biaxially oriented blow molded product obtained by blow molding the preform.

DETAILED DESCRIPTION OF THE PREFERRED EMBODIMENTS

The aromatic polyester to which the present invention is directed is a polyester comprising at least one aromatic dicarboxylic acid selected from the group consisting of terephthalic acid and 2,6-naphthalenedicarboxylic acid as a main dicarboxylic acid component and ethylene glycol as a main glycol component. That is, the above aromatic polyester includes (1) a polyester comprising ethylene-2,6-naphthalene dicarboxylate as a main recurring unit, (2) a polyester comprising ethylene terephthalate as a main recurring unit and (3) a polyester comprising ethylene-2,6-naphthalene dicarboxylate and ethylene terephthalate as main recurring units.

The aromatic polyester comprising ethylene-2,6-naphthalene dicarboxylate as a main recurring unit in the present invention may be a copolymer obtained through copolymerization by substituting part of a 2,6-naphthalene dicarboxylic acid component with at least one member selected from other aromatic dicarboxylic acids such as 2,7-, 1,5- and 1,7-naphthalenedicarboxylic acids, isophthalic acid, terephthalic acid, diphenyldicarboxylic acid, diphenoxyethane dicarboxylic acid, diphenyl ether dicarboxylic acid, diphenylsulfone dicarboxylic acid and tetrahydronaphthalene dicarboxylic acid; alicyclic dicarboxylic acids such as hexahydroterephthalic acid, hexahydroisophthalic acid and decahydronaphthalene dicarboxylic acid; aliphatic dicarboxylic acids such as adipic acid, sebacic acid and azelaic acid; and other bifunctional carboxylic acids such as oxyacids exemplified by p-β-hydroxyethoxybenzoic acid and ε-oxycaproic acid in an amount of 20 mol % or less.

The aromatic polyester comprising ethylene-2,6-naphthalene dicarboxylate as a main recurring unit may be a copolymer obtained through copolymerization by substituting part of an ethylene glycol component with at least one member selected from other diol compounds such as trimethylene glycol, tetramethylene glycol, hexamethylene glycol, decamethylene glycol, neopentyl glycol, diethylene glycol, 1,1-cyclohexane dimethanol, 1,4-cyclohexane dimethanol, 2,2-bis(4'-β-hydroxyphenyl)propane and bis(4'-β-hydroxyethoxyphenyl)sulfonic acid in an amount of 20 mol % or less.

The aromatic polyester comprising ethylene-2,6-naphthalene dicarboxylate as a main recurring unit in the present invention may be a copolymer obtained through copolymerization by substituting each of a 2,6-naphthalene dicarboxylic acid component and an ethylene glycol component with the above copolymer components in an amount of 20 mol % or less.

The aromatic polyester comprising ethylene terephthalate as a main recurring unit in the present invention may be a copolymer obtained through copolymerization by substituting part of terephthalic acid with at least one member selected from other aromatic dicarboxylic acids such as isophthalic acid, 2,6-naphthalenedicarboxylic acid, diphenyldicarboxylic acid, diphenoxyethane dicarboxylic acid, diphenyl ether dicarboxylic acid, diphenylsulfone dicarboxylic acid and tetrahydronaphthalene dicarboxylic acid; and the same alicyclic dicarboxylic acids, aliphatic dicarboxylic acids and oxyacids as those listed above in an amount of 20 mol % or less. The aromatic polyester comprising ethylene terephthalate as a main recurring unit may be a copolymer obtained through copolymerization by substituting part of an ethylene glycol component with at least one member selected from the same other diol compounds as those listed above in an amount of 20 mol % or less.

The aromatic polyester comprising ethylene terephthalate as a main recurring unit in the present invention may be a copolymer obtained through copolymerization by substituting each of a terephthalic acid component and an ethylene glycol component with the above copolymer components in an amount of 20 mol % or less.

Further, the aromatic polyester comprising ethylene-2,6-naphthalene dicarboxylate and ethylene terephthalate as main recurring units in the present invention is preferably a blend of a polyester comprising ethylene-2,6-naphthalene dicarboxylate as a main recurring unit and a polyester comprising ethylene terephthalate as a main recurring unit. As the two polyesters may be used aromatic polyesters having the same compositions as the aforementioned aromatic polyesters.

As for the blending ratio of the two polyesters of the blend, the weight ratio of the polyester comprising ethylene-2,6-naphthalene dicarboxylate as a main recurring unit to the polyester comprising ethylene terephthalate as a main recurring unit is preferably 56:44 to 2:98 for the purpose of reducing the content of acetaldehyde and the content of oligomers in a molded product obtained from this blend and improving the ultraviolet screening function, gas barrier properties and heat resistance of the molded product.

The polyester comprising ethylene-2,6-naphthalene dicarboxylate as a main recurring unit and the polyester comprising ethylene terephthalate as a main recurring unit in the present invention may contain an antioxidant, ultraviolet absorber, plasticizer and the like as required, or may be subjected to a hydrothermal treatment, moisture conditioning treatment or the like after the production of the polymer.

A description is subsequently given of the above blend.

The above two different polyesters used in the present invention can be produced by conventionally known methods. The acetaldehyde content of at least the aromatic polyester comprising ethylene terephthalate as a main recurring unit is preferably controlled to 10 ppm or less, more preferably 2 ppm or less, by solid-phase polymerization.

The above blend preferably contains a germanium compound in an amount of 20 to 90 ppm in terms of Ge atoms and an antimony compound in an amount of 3 to 110 ppm in terms of Sb atoms.

When the content of Ge is smaller than 20 ppm, the polymerization rate for the production of the polymer is remarkably low disadvantageously. On the other hand, when the content of Ge is larger than 90 ppm, the effect of reducing the content of acetaldehyde after molding is not always satisfactory disadvantageously. When the content of Sb is smaller than 3 ppm, the polymerization rate for the production of the polyester is low disadvantageously. On the other hand, when the content of Sb is larger than 110 ppm, the effect of reducing the content of acetaldehyde and the content of oligomers after molding is not satisfactory disadvantageously.

Ge used as a polymerization catalyst is exemplified by such compounds as germanium dioxide and germanium tetrabutoxide and Sb used as a polymerization catalyst is exemplified by antimony trioxide and antimony acetate.

Ge and Sb can be derived from both the aromatic polyester comprising ethylene terephthalate as a main recurring unit and the aromatic polyester comprising ethylene-2,6-naphthalene dicarboxylate as a main recurring unit.

Ge is preferably derived from a polymerization catalyst used for the production of the aromatic polyester comprising ethylene terephthalate as a main recurring unit, and Sb is preferably derived from a polymerization catalyst used for the production of the aromatic polyester comprising ethylene-2,6-naphthalene dicarboxylate as a main recurring unit.

In the present invention, the aromatic polyester comprising ethylene terephthalate as a main recurring unit preferably contains Ge in an amount of 30 to 100 ppm. When the content of Ge is smaller than 30 ppm, the polymerization rate for the production of the polymer is remarkably low, while when the content of Ge is larger than 100 ppm, the effect of reducing the content of acetaldehyde after molding is not satisfactory. The content of Ge is more preferably 40 to 90 ppm, particularly preferably 50 to 80 ppm.

The aromatic polyester comprising ethylene-2,6-naphthalene dicarboxylate as a main recurring unit preferably contains Sb in an amount of 100 to 350 ppm. When the content of Sb is smaller than 100 ppm, the polymerization rate for the production of the polymer is remarkably low, while when the content of Sb is larger than 350 ppm, the effect of reducing the content of acetaldehyde and the content of oligomers after molding is not satisfactory.

The preform production process of the present invention comprises supplying the above aromatic polyesters to an injection molding machine to produce a preform. The injection molding machine used in the process has a vent from which air is exhausted under reduced pressure during injection molding. The location of the vent is important. The vent is located at the position of a cylinder between (i) a position where the aromatic polyester is substantially molten in the cylinder of the injection molding machine and (ii) the position of the front-end of the metering zone of a screw when the molten aromatic polyester is stored in the front-end portion of the cylinder of the injection molding machine for injection molding. A plurality of vents may be created between the positions. Specifying the position (i) more accurately, it is at the downstream end of the metering zone of the screw where the screw backs off the most to the downstream side under the above molding conditions. It can be understood that the position of the downstream end can be changed by molding conditions.

The location of the metering zone of the screw is specified and known in this type of injection molding machine. During injection molding, air is preferably exhausted from the vent at a reduced pressure of 10 mmHg or less. According to the present invention, a preform having a small content of acetaldehyde and a small content of oligomers can be produced repeatedly with good reproductivity. For example, according to the process of the present invention, a preform having an acetaldehyde content of 20ppm or less can be easily produced.

The obtained preform provides a biaxially oriented blow molded product such as a bottle by blow molding. The molded preform may be cooled and reheated before blow molding or blow-molded without being cooled.

A biaxially oriented blow molded product having an acetaldehyde content of 20 ppm or less is also easily provided.

EXAMPLES

The following examples are given to further illustrate the present invention. The measurement conditions of main physical properties are as follows.
(1) Haze
This is measured by the turbidimeter of Nippon Denshoku Kogyo Co., Ltd.

(2) Content of Acetaldehyde
A sample is frozen in liquid nitrogen and milled. The content of acetaldehyde in the sample is measured by gas chromatography.
(3) Content of Acetaldehyde Measured by Head Space Method (to be Referred to as "HS-AA" Hereinafter)
A bottle obtained by blow molding is left to stand at room temperature for 20 minutes, purged with 2 $kgf/cm^2$ of nitrogen for 30 seconds and sealed with an aluminum cap. After the bottle is maintained at 22° C. for 24 hours, the content of acetaldehyde in the gas phase of the bottle is measured by gas chromatography.
(4) Content of Oligomers
A sample is milled at normal temperature and dissolved in a mixed solvent of hexafluoroisopropanol and chloroform in a ratio of 1:1, and the solution is measured by GPC. The total content of oligomers, which have 5 or less molecule units and which consist of the ethylene terephthalate unit, naphthalene dicarboxylate units and both of the units, is calculated from the previously formed calibration curve.

Example 1

Ninety percent by weight of a polyethylene terephthalate pellet (IV (measured using a mixed solvent of tetrachloroethane and phenol in a ratio of 4:6)=0.76, content of acetaldehyde=1.0 ppm, content of oligomers=0.38 wt %, to be referred to as "homo-PET" hereinafter) having a Ge content of 70 ppm and 10 wt % of a polyethylene-2,6-naphthalene dicarboxylate pellet (IV (measured in the same manner as described above)=0.46, content of acetaldehyde= 151 ppm, content of oligomers=0.57 wt %, to be referred to as "homo-PEN" hereinafter) were dry-blended. The obtained blend was dried with hot air at 160° C. for 5 hours. A vent was formed on a hopper side 95 mm from the nozzle of an injection molding machine (M100-DM of Meiki seisakusho Co., Ltd.) (this position is in the section between a position where the aromatic polyester was substantially molten in the cylinder of the injection molding machine and the position of the front-end of the metering zone of a screw when the molten aromatic polyester was stored in the front-end portion of the cylinder of the injection molding machine for injection molding). The pressure was reduced to 5 mmHg from the vent by a vacuum pump, the blend was then injection-molded into a mold cooled with cooling water of 10° C. at a cylinder set temperature of 305° C. and a molding cycle of 90 seconds to obtain a preform having a weight of 55 g. The preform was shaped like a cylinder with one bottomed end, which had an outer diameter in its barrel portion of 22 to 24 mm, a thickness of 3.5 mm and a total length of 150 mm, and was a substantially amorphous achromatic transparent molded product. The acetaldehyde content of the obtained preform was 20 ppm and the oligomer content thereof was 0.41 wt %. This preform was blow-molded into a 1.5-liter self-supporting bottle having a pettaloyd-type bottom portion by the RHB-L blow molding machine of Cincinnati Milacron Co., Ltd. The barrel portion of the obtained bottle had a haze value of 0.9%. Results are shown in Table 1.

Example 2

The procedure of Example 1 was repeated except that ethylene-2,6-naphthalene dicarboxylate containing 7 mol % of dimethyl terephthalate (DMT) was used in place of the homo-PEN as shown in Table 1. Results are shown in Table 1.

TABLE 1

| | polyester (A) (ppm) | polyester (B) (ppm) | (A)/(B) (weight ratio) | haze (%) | acetaldehyde (ppm) | HS · AA ($\mu$g/L) | oligomers (wt %) | vacuum degree of vent (at the time of metering) (mmHg) |
|---|---|---|---|---|---|---|---|---|
| Ex. 1 | homo-PET Ge = 70 | homo-PEN Sb = 200 | 9/1 | 0.9 | 20 | 2.30 | 0.41 | 5 |
| Ex. 2 | homo-PET Ge = 70 | DMT 7 mol % copolymer Sb = 200 | 9/1 | 0.9 | 20 | 2.42 | 0.42 | 5 |

Ex.: Example

Example 3

Polyethylene-2,6-naphthalene dicarboxylate chips (IV (measured using a mixed solvent of tetrachloroethane and phenol in a ratio of 4:6)=0.65, AA=0.5 ppm) were dried with a dehumidifying drier at 160° C. for 5 hours. A vent was formed on a hopper side 95 mm from the cylinder head of the injection molding machine M100-DM of Meiki seisakusho Co., Ltd. (this position is in the section between a position where the aromatic polyester was substantially molten in the cylinder of the injection molding machine and the position of the front-end of the metering zone of a screw when the molten aromatic polyester was stored in the front-end portion of the cylinder of the injection molding machine for injection molding). The pressure was reduced to 5 mmHg from the vent by a vacuum pump, and the chips were injection-molded into a mold cooled with cooling water of 10° C. at a cylinder set temperature C1=C2 =C3 =nozzle=305° C. and a molding cycle of 30 seconds by the above injection molding machine to obtain a preform having a weight of 55 g. The screw of the injection molding machine had a 90-mm metering zone, 260-mm compression zone, a 440-mm feed zone, a cushion amount after injection molding of 5 mm, and a retreat distance at the end of metering of 85 mm. The preform was shaped like a cylinder with one bottomed end, which has an outer diameter in its barrel portion of 22 to 24 mm, a thickness of 3.5 mm and a total length of 150 mm, and was a substantially amorphous achromatic transparent molded product. When the content of AA in the preform was measured, it was 15 ppm. This preform was blow-molded into a 1.5-liter self-supporting bottle having a pettaloyd-type bottom portion by the RHB-L blow molding machine of Cincinnati Milacron Co., Ltd. The HSAA of the obtained bottle was 0.52 $\mu$g/l. The measurement results of the AA of the preform and the HSAA of the bottle are shown in Table 2.

Example 4

A preform was obtained in the same manner as in Example 3 (in this case, the vent is in the section between a position where the aromatic polyester was substantially molten in the cylinder of the injection molding machine and the position of the front-end of the metering zone of a screw when the molten aromatic polyester was stored in the front-end portion of the cylinder of the injection molding machine for injection molding) except that polyethylene-2, 6-naphthalene dicarboxylate copolymer chips (IV (measured in the same manner as in Example 3)=0.71, AA=5.0 ppm) containing 8 mol % of a terephthalic acid component were used and that the cylinder set temperature was set to C1=C2=C3=nozzle=295° C. The measurement results of the AA of the preform and the HSAA of the bottle are shown in Table 2.

Comparative Example 1

A molded product was obtained in the same manner as in Example 3 except that molding was carried out without exhausting air from the vent. The measurement results of the AA of the preform and the HSAA of the bottle are shown in Table 2.

Comparative Example 2

A molded product was obtained in the same manner as in Example 3 (in this case, the vent is not in the section between a position where the aromatic polyester was substantially molten in the cylinder of the injection molding machine and the position of the front-end of the metering zone of a screw when the molten aromatic polyester was stored in the front-end portion of the cylinder of the injection molding machine for injection molding). except that the position of the vent was located on the hopper side 300 mm from the cylinder head. The measurement results of the AA of the preform and the HSAA of the bottle are shown in Table 2.

TABLE 2

| | raw material chip | position of vent | vacuum degree of vent (mmHg) | AA of preform (ppm) | HSAA of bottle ($\mu$g/L) |
|---|---|---|---|---|---|
| Ex. 3 | polyethylene-2,6-naphthalene dicarboxylate | 95 mm from cylinder head | 5 | 20 | 0.52 |
| Ex. 4 | terephthalic acid component copolymerized polyethylene-2,6-naphthalene dicarboxylate | 95 mm from cylinder head | 5 | 18 | 0.58 |
| C. Ex. 1 | polyethylene-2,6-naphthalene dicarboxylate | 95 mm from cylinder head | 760 | 42 | 1.18 |
| C. Ex. 2 | polyethylene-2,6-naphthalene dicarboxylate | 300 mm from cylinder head | 5 | 38 | 1.05 |

Ex.: Example,
C. Ex.: Comparative Example

As described above, according to the process of the present invention, an aromatic polyester preform having a small content of acetaldehyde can be readily produced.

According to the present invention, an injection molded product, particularly a bottle having excellent transparency and small contents of acetaldehyde and oligomers, can be obtained from an aromatic polyester comprising ethylene terephthalate as a main recurring unit and an aromatic polyester comprising ethylene-2,6-naphthalene dicarboxylate as a main recurring unit. The molded product is particularly advantageously used as a container for a beverage.

What is claimed is:

1. A process for producing a preform by injection molding an aromatic polyester which comprises at least one aromatic dicarboxylic acid selected from the group consisting of terephthalic acid and 2,6-naphthalenedicarboxylic acid as a main dicarboxylic acid component and ethylene glycol as a main diol component, wherein injection molding is carried out by an injection molding machine, which has at least one vent at the position of a cylinder between a position where the aromatic polyester is substantially molten in the cylinder of the injection molding machine and the position of the front-end of the metering zone of a screw when the molten aromatic polyester is stored in the front-end portion of the cylinder of the injection molding machine for injection molding, while air is exhausted from the vent under reduced pressure.

2. The process of claim 1, wherein the main recurring unit of the aromatic polyester is ethylene-2,6-naphthalene dicarboxylate.

3. The process of claim 1, wherein the main recurring unit of the aromatic polyester is ethylene terephthalate.

4. The process of claim 1, wherein the aromatic polyester is a blend of a polyester comprising ethylene-2,6-naphthalene dicarboxylate as a main recurring unit and a polyester comprising ethylene terephthalate as a main recurring unit.

5. The process of claim 4, wherein the weight ratio of the polyester comprising ethylene-2,6-naphthalene dicarboxylate as a main recurring unit to the polyester comprising ethylene terephthalate as a main recurring unit is 56:44 to 2:98.

6. The process of claim 4, wherein the blend contains a germanium compound in an amount of 20 to 90 ppm in terms of Ge atoms and an antimony compound in an amount of 3 to 110 ppm in terms of Sb atoms.

7. The process of claim 1, wherein the position where the aromatic polyester is substantially molten in the cylinder of the injection molding machine is the downstream end of the metering zone of the screw at a position where the screw backs off the most to the downstream side under molding conditions.

8. The process of claim 1, wherein air is exhausted at a reduced pressure of 10 mmHg or less.

9. A preform obtained by the process of claim 1.

10. The preform of claim 9, which has an acetaldehyde content of 20 ppm or less.

11. A biaxially oriented blow molded product obtained by blow molding a preform obtained by the process of claim 1.

12. The biaxially oriented blow molded product of claim 11, which has an acetaldehyde content of 20 ppm or less.

* * * * *